United States Patent

[11] 3,584,667

[72] Inventor Bernard F. Reiland
 Rockford, Ill.
[21] Appl. No. 872,180
[22] Filed Oct. 26, 1969
[45] Patented June 15, 1971
[73] Assignee Textron Inc.
 Rockford, Ill.
 Continuation of application Ser. No.
 624,853, Mar. 21, 1967, now abandoned,
 which is a continuation-in-part of
 application Ser. No. 580,223, Sept. 19,
 1966, now abandoned.

[54] COUPLING ARRANGEMENT AND TOOLS FOR SAME
 17 Claims, 28 Drawing Figs.
[52] U.S. Cl. .................................................. 145/50, 85/45
[51] Int. Cl. .................................................. B25b 15/00, F16b 23/00
[50] Field of Search .................................................. 85/45, 9, 32; 145/50.1; 287/19, 126

[56] References Cited
 UNITED STATES PATENTS
 2,083,092 6/1937 Richer .................................................. 85/45
 2,969,250 1/1961 Kull .................................................. 85/45
 3,187,790 1/1965 Wing .................................................. 145/50
 FOREIGN PATENTS
 1,273,228 8/1961 France .................................................. 85/45
 U.M. 730,401 1/1964 Japan .................................................. 85/45
 D216,905 6/1963 Japan .................................................. 85/45

Primary Examiner—Robert C. Riordon
Assistant Examiner—Roscoe V. Parker, Jr.
Attorney—Buckhorn, Blore, Klarquist and Sparkman ABSTRACT: A torque-transmitting or coupling arrangement, and tools for same consists of a body portion having a first series of similar arcuately curved surfaces with their centers of curvature located at the corners of a regular hexagon and which surfaces are disposed outwardly of such centers with respect to the axis of the body. A second series of surfaces curved oppositely to those of the first series and alternating therewith extend substantially to the sides of said hexagon midway between the corners thereof while the ends of the second series merge tangentially with adjacent ends of the first series. The radius of curvature of the second series is from two to three times that of the first series whereby the midpoint of said second series is closer to the axis of said body than the midpoint of said first series by an amount equal approximately to 50 percent more than the length of the radii of said first series. Moreover, each of the first series of surfaces has an angular extent of the order of 20 to 25° whereby the resultant shear area provided outwardly of the second series of surfaces is approximately double the shear area formed inwardly of the first series of surfaces. Also, contiguous surface portions of said two series of surfaces are formed defining a driving area of 10 to 20° whereby higher torques than heretofore possible can readily be transmitted from a driving unit to a driven unit of mating configuration without damaging either.

BERNARD F. REILAND
INVENTOR

BY
BUCKHORN, BLORE, KLARQUIST & SPARKMAN
ATTORNEYS

BERNARD F. REILAND
INVENTOR
BY
BUCKHORN, BLORE, KLARQUIST & SPARKMAN
ATTORNEYS

COUPLING ARRANGEMENT AND TOOLS FOR SAME

This application is a continuation of my copending application Ser. No. 624,853 filed Mar. 21, 1967, now abandoned, and which in turn was a continuation-in-part of my parent application Ser. No. 580,223 filed Sept. 19, 1966, now abandoned, entitled Fastener Device and Drive Therefor.

BACKGROUND OF THE INVENTION

1. Description of the Prior Art

A hexagonal configuration commonly employed for transmitting torque from a driving unit to a driven unit consists of six plane surfaces arranged parallel to and symmetrically about, a central axis. Because of the large driving angle and point contacts between the adjacent engaged surfaces, the driving torque is inefficiently transmitted from the driving unit to the driven unit. Dependent upon the amount of tolerance usually provided therebetween, the opposing surfaces of the externally arranged unit tend to be wedged apart, while at the same time the zones commonly referred to as stress risers, such as sharp corners of the driven unit, are overstressed. In order to minimize the likelihood of failure of either the driving unit or the driven unit, these parts are frequently enlarged so as to reduce the stress per unit of area to a value within the strength limitations of the metal from which the coupling parts are made. The coupling parts therefore tend to become heavy, which is objectionable, especially in those instances where minimum weight is desirable, and is also expensive, especially where costly alloys are used.

It has also been proposed heretofore to provide a multiplicity of square cornered splines distributed about the perimeter of the driven unit, the driving member being similarly splined complementary to the splined surface of the driven unit. Such splined surfaces are expensive to produce, frequently necessitating machining operations, and include many stress risers, so that splined couplings have not been deemed feasible except in limited areas.

Others have heretofore proposed to provide the driven unit with a surface configuration consisting of a plurality of curved surfaces, either internal or external, uniformly distributed throughout 360°, forming a series of alternating ridges and flutes of substantially equal width. Such coupling arrangements still do not permit application of driving torques sufficient to meet present-day requirements. Upon attempted application of high torques, either the driving member will fail by cracking or the relatively small ribs of the driven member will shear off. The latter failure is usually accompanied by a camming of the driving member away from the driven member.

The above-mentioned and other disadvantages are overcome by the present invention by providing a new and improved hex-lobular surface configuration for use between complementary interfitting driver and driven units whereby high torques can be transmitted from the driver to the driven unit. In fact, high torques can be transmitted even with a substantial reduction in size and mass of material required for the coupling portions. Moreover, such high torques can be transmitted from one unit to the other with a force distribution such that there is little likelihood of damage to the coupling portions, little or no likelihood of cam-out, reaming or other failure of either the driving or the driven unit.

2. Field of the Invention

In accordance with the present invention, a new and improved hex-lobular surface configuration is provided and which is of such a design that it may readily be substituted for various more common forms of surface configurations heretofore provided, and is substantially universal in its applicability. Thus, the configuration of the invention is applicable not only to external heads of driven members but equally well to driving recesses of the internally surfaced type. The invention is applicable to a wide variety of products of manufacture of the class to be hereinafter described, including fasteners and drivers therefor, and also to fittings, torque transmission couplings generally and to tools therefor, including wrenches, punches and dies, and the like.

SUMMARY OF THE INVENTION

The present invention includes a surface configuration for a part of a body or member comprising a torque-transmission unit, or a tool for use with or for forming such unit part. The configuration as disclosed in the illustrated embodiments consists essentially of a first series of spaced apart, semicylindrical or substantially semicylindrical surfaces disposed in a hexagonal array on a body portion and with the axes of such curved surfaces coincident with the apices of the regular hexagon. A second series of curved surfaces curving in the opposite direction with respect to the surfaces of the first series alternate, and at their edges mere tangentially with the adjacent edges of the surfaces of the first series. The axes of curvature of the first series are disposed between the respective corresponding surface and the central axis of the body portion, whereas the axes of curvature of the second series of surfaces are disposed on the opposite side of the respective corresponding surface with respect to the central axis.

The present invention resides primarily in the particular aspects of the two series of curved surfaces and their relationship with respect to each other whereby when incorporated in matching driving and driven members high torques can be efficiently and effectively transmitted from one to the other with minimum risk of damage to either part. To accomplish these objectives, the radius of curvature of the first series of curved surfaces is made relatively small, that is, from 5 to 10 percent of the major diameter across said first series of curved surfaces. The radius of curvature of the second series of curved surfaces is from two to three times that of the first series of curved surfaces whereby the midpoint of said second series is closer to the axis of said body than the midpoint of said first series by an amount equal approximately to 50 percent more than the length of the radii of said first series. Moreover each of the first series of surfaces has an angular extent of the order of 20° to 25° and contiguous surface portions of said two series define a driving angle of 10° to 20°. Large shear areas are thus provided between the outermost limits of an adjacent pair of the first series of surfaces and which shear areas are approximately double the size of the shear areas formed between the innermost points of an adjacent pair of the second series of surfaces. This relationship of the shear areas of the driving and driven units together with the small drive angle of 10° to 20° therebetween makes possible the transfer of higher torques than heretofore possible with a minimum loss of energy.

It is therefore the primary object of the present invention to provide a new and improved torque transmission or coupling unit and tools for same of compact design, inexpensive to manufacture, but which will possess high strength and enable the transmission of higher torques than heretofore possible with comparable devices previously used or proposed.

A further object is to provide a reinforcing shoulder between adjacent ribs defined by the first series of curved surfaces and which serve not only to strengthen the ribs but also to strengthen the cross section of the body adjacent the innermost end of the ribbed portion.

The invention may also be embodied in tools for the aforementioned coupling, or torque-transmitting devices, such tools being either in the form of drivers, of either externally or internally surfaced types, or in the form of punches for forming the heads of coupling, or torque-transmitting units, of either externally or internally surfaced forms.

DESCRIPTION OF PREFERRED EMBODIMENTS

Figures 1, 2, 3, 10:
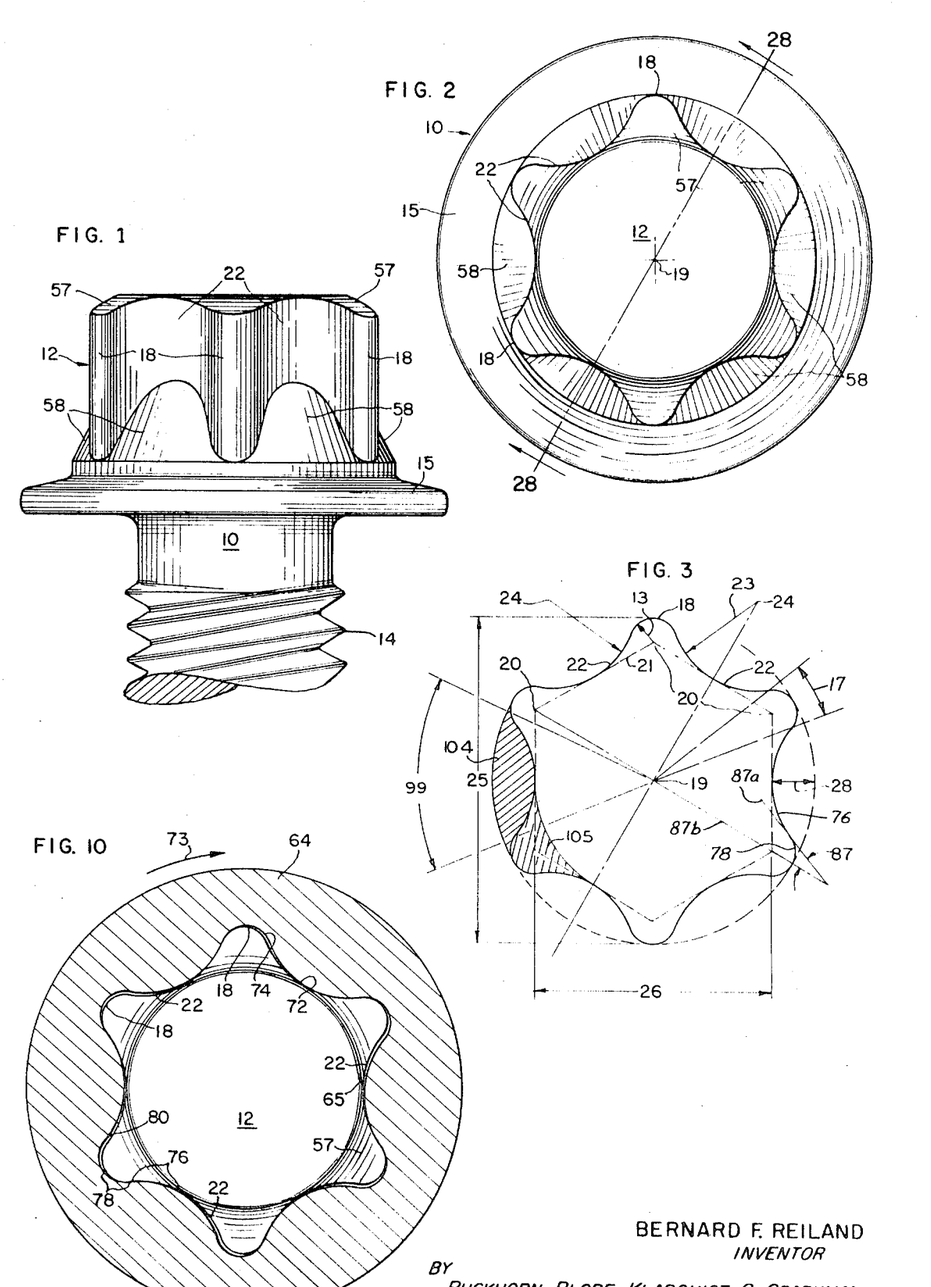
FIG. 1 is a side elevation of a part of a fastener device showing a head having a configuration in accordance with the present invention.
FIG. 2 is a plan view of the head shown in FIG. 1.
FIG. 3 is a schematic sketch illustrating in greater detail and clarity the configuration provided circumferentially of the head of the device illustrated in FIGS. 1 and 2.
FIG. 10 is a cross-sectional view taken along the line 10—10 of FIG. 8.

The invention will first be described with respect to a torque transmission coupling arrangement such as may be provided between a driving unit and a complementary driven unit, e.g. a headed fastener device and a driver or wrench for use therewith. Referring to FIGS. 1, 2 and 3, the head end of a finished fastener device 10 is illustrated having a body with a head portion 12 of the external driving surface type and a threaded shank portion 14 on the other end. The head 12 includes an enlarged base, or bearing washer 15. The head portion 12 is defined in part by a first series of six spaced apart, semicylindrical or substantially semicylindrical surfaces defining the lobes 18. As illustrated more clearly in the schematic view of FIG. 3, the centers or axes of curvature 20 of the surfaces 18 are disposed between the surfaces 18 and the central axis 19. The axes 20 of the respective surfaces 18 are located at the apices of a regular hexagon indicated by dotted lines 21. A second series of six semicylindrical or otherwise curved, lateral surfaces 22 alternate with the surfaces 18 and the opposite ends thereof merge smoothly and tangentially therewith. The surfaces 22 are oppositely curved with respect to surfaces 18. The centers or axes of curvature of the second series of surfaces 22 indicated at 24 are disposed on the opposite side of the corresponding surface 22 with respect to the central axis 19. The radius of curvature 13 of the curved surfaces 18 is relatively small, approximately 5 to 10 percent of the major diameter 25. In the illustrated embodiment, the radius of curvature 23 of the second series of surfaces 22 is considerably greater, preferably more than two times greater, than the radius of curvature 13 of the surfaces 18 whereby the angular extent of the surfaces 22 is much greater than that of the surfaces 18. Referring to FIG. 3, it will be observed that in accordance with the illustrated embodiment, the angular extent 17 of the lobes 18 is preferably of the order of 20° to 25°. The surfaces 18, therefore, may be said to define the corners of a hex-lobular array while the space therebetween represents the sides thereof.

It will be observed that in the illustrated embodiment the major diameter 25 across the surfaces of the first series is much greater than the minimum diameter 26 across the intermediate surfaces 22, one-half the difference between such major and minor diameters being indicated at 28. In other words, the distance 28 represents the depth of the flutes between the lobes formed by the surfaces 18, and this distance constitutes the difference between the maximum radial dimension of the surfaces 18 and the minimum radial dimension of the surfaces 22, both dimensions being measured from axis 19. This difference is preferably between 25 and 30 percent of the maximum radial dimension, and is also approximately 50 percent greater than the radius of curvature 13 of the surfaces 18.

Figures 4, 9:
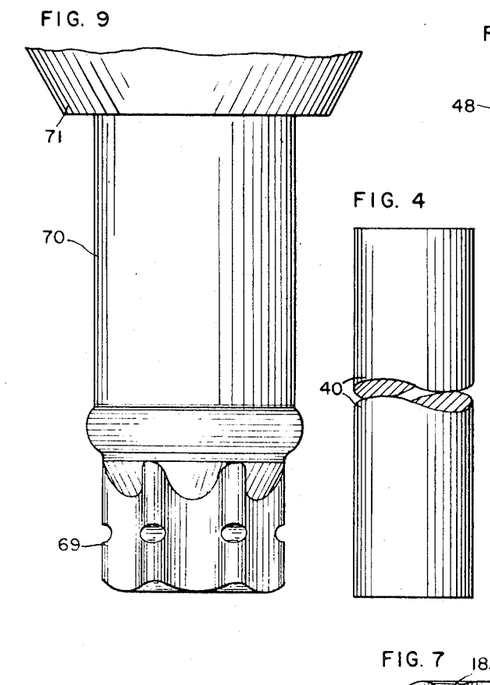
FIG. 4 illustrates a workpiece from which a fastener device as illustrated in FIGS. 1 and 2 may be manufactured.
FIG. 9 is a side elevation of a coupling stem of a drive tool.
Figures 5, 7, 11:
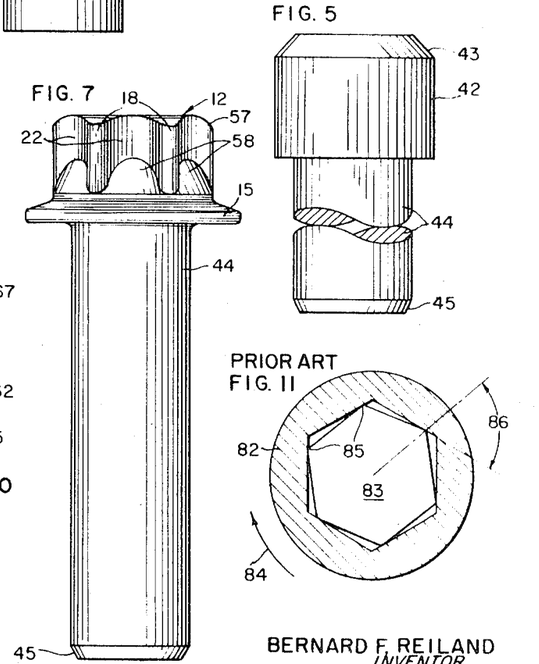
FIG. 5 is a side elevation illustrating a workpiece during an intermediate step in the manufacture of the finished fastener.
FIG. 7 is a side elevation illustrating the finished blank following the formation of the head.
FIG. 11 is a sectional view comparable to the view of FIG. 10 but illustrating a prior art arrangement.
Figure 6:
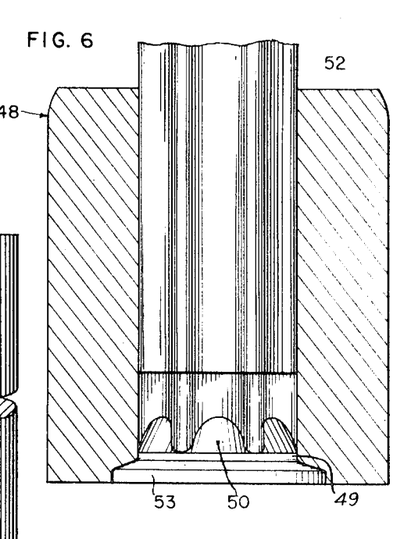
FIG. 6 is a side elevation, partly in section, illustrating a tool utilized in the formation of the head of the fastener device shown in FIG. 1.

In the manufacture of fastener devices as illustrated in FIG. 2, a workpiece is first severed from a length of rod or wire stock as illustrated, for example, at 40 in FIG. 4. In the first blow imparted to the workpiece in the cold heading machine, the upper end of the workpiece is upset to form an enlarged bloom 42, as illustrated in FIG. 5. The upper edge of the bloom 42 is preferably chamfered as indicated at 43 and at the same time the lower end of the shank 44 may be coned as desired as at 45. The bloom 42 is transformed into a finished head by means of an extrusion punch provided with an insert 48 as illustrated in FIG. 6. The insert 48 is provided with an inner configuration complementary to that of the head 12 as previously described and includes a short cylindrical section 49 having a diameter only slightly greater than the diameter of the bloom 42 and which, in turn, is only slightly greater than the major diameter 25 across the lobes of the finished head. It is understood, of course, that the workpiece is supported within a holding die as the punch 48 is advanced theretoward. The upper end of the bloom 42 first passes into the short cylindrical section 49 and is thereby supported against lateral deformation as the punch proceeds. The inwardly sloping shoulders 50 defining the flutes of the head direct the flow of metal of the bloom inwardly, causing the same to be extruded upwardly as viewed in FIGS. 5 and 6, or in the direction reverse to the direction of the movement of punch 48, until the metal comes into engagement with the bottom of the knockout punch 52. Further advancement of the punch 48 causes the base portion of the bloom 42 to flow outwardly, filling the enlarged diameter portion 53 of the punch and which, in turn, forms the enlarged bearing washer 15 of the finished blank illustrated in FIG. 7. The finished head 12 of the blank shown in FIG. 7 is therefore formed in part by a reverse extrusion process. As will be explained more fully hereinafter, by the extrusion process described, a head is formed having a higher strength than if it were formed solely by an upsetting process. Because of the chamfer 43 which is formed on the upper end of the bloom 42, the punch 48 may readily be separated from the workpiece by the knockout punch 52 without the occurrence of a burr at the upper ends of the flutes of the head and which would be likely if the chamfer 43 were not first provided. The chamfer 43 also results in a slight chamfer on the upper ends of the lobes of the finished head as indicated at 57. Due to the reverse extrusion process, the head 12 and particularly the ribs defined by the lobes 18 are strengthened as compared with the metal of the remainder of the blank. These strong ribs are further reinforced by the shoulders 58 which slope inwardly from the innermost ends of the ribs 18 adjacent the washer portion 15 and upwardly toward the free ends of the ribs for a distance of approximately one-half the height of the ribs.

After the formation of the head 12 is completed in the heading machine, a thread may be formed on the shank 44 in a manner well known in the art. The threaded device may then be heat-treated or plated, or both, as may be desired.

The fastener device as thus far described, being of the external surfaced driving head type, the driver therefor is provided with an internal surface configuration substantially identical to that previously described except that the surfaces are so dimensioned that there will be a reasonable amount of clearance therebetween to permit of ready assembly of the driver over the fastener head. It will be obvious that while the tool device 48 shown in FIG. 6 could be incorporated in a suitable driver, a preferred form of driving tool is shown in FIG. 8.

Figure 8:
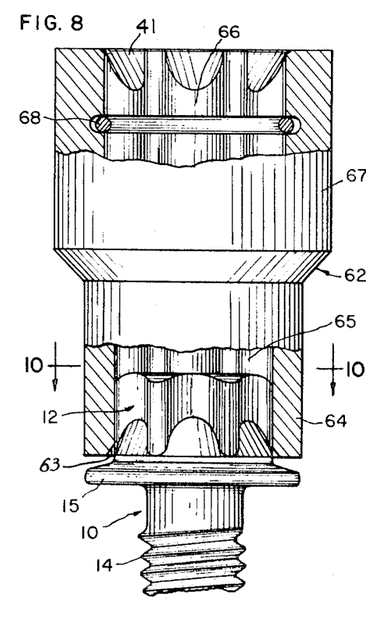
FIG. 8 is a side elevation, partly in section, showing a driven unit with a driving unit assembled on the head thereof.

In FIG. 8 a driving tool 62 is shown assembled over the head 12 of the driven device 10. The tool comprises a coupling portion 64 provided with a circumferential inner surface 65 which is complementary to the configuration of the head 12, as previously described. The lower inner corner of the driver is provided with a slight bevel or chamfer 63 to facilitate assembly of the tool over the head 12. The lower end of the driver portion 64 is also provided with sloping shoulders similar to the sloping shoulders 50 as shown in FIG. 6 to fit cooperatively with the shoulders 58 of the driven unit. These shoulders are formed on the lower end portions of the inwardly extending ribs of the driver and diverge outwardly toward the lowermost or free ends of the concave surfaces. Similar sloping shoulders are also shown at 41 in FIG. 8. The tool 62 also includes an upper coupling portion 67 which is provided with a recess 66 for cooperatively receiving the end 69 of a shaft 70 forming a part of the power unit 71, shown in FIG. 9. The recess 66 and the end 69 of the shaft 70 received thereby are preferably of the same cross-sectional configuration as those of the fastener head 12 and unit 64, as illustrated in FIG. 8. A retainer ring 68 is indicated as being provided within a groove in the sidewalls of the recess 66 for retaining the unit 62 in place upon the tool supporting shaft 70.

FIG. 10 illustrates, in enlarged detail, the relationship of the interengaged surfaces of the driving device 64 and the head 12 of the driven device with a driving torque applied against the latter by means of the device 64 in the direction of the arrow 73. As previously indicated, the driving device 64 is provided with inwardly extending, or convex, surfaces 72 which are complementary to the concave surfaces 22 of the fastener head 12 and with intermediate concave surfaces 74, complementary to the convex surfaces or lobes 18 of the head 12. On account of the relatively great depth of the flutes formed by the concave surfaces 22, and as previously indicated at 28 in FIG. 3, a relatively large area is provided for driving engagement. Thus the torque-transmitting or driving surface is defined as being comprised of contiguous surface portions 78 and 76 of the outwardly extending lobes 18 and of the opposite or inwardly directed curved surfaces 22, respectively. The driving angle as indicated at 87 in FIG. 3 is further defined as the angle between the line 87a which is tangent to a point of contiguity of the oppositely curved surface portions 78 and 76 and the radius 87b extending from the center 19 and bisecting the lobe 18 immediately adjacent to the torque-transmission surface.

The drive angle 87 is from 10° to 20°, and preferably approximately 15°. It is to be understood that this small driving angle coupled with the relatively deep flutes and resultant large shear areas between the lobes providing for deep torque engagement between the driving and driven elements of the torque-transmitting coupling is a major feature of the present invention.

Referring to FIG. 11, which illustrated prior art, a hexagonal socket wrench 82 is shown assembled upon a hexagonal driven unit 83. Upon application of a torque to the tool 82 in the direction indicated by arrow 84, contact will occur between adjacent surfaces of the driving and driven units only at the circumferentially distributed points 85. Of necessity, in order to facilitate ease of assembly of the wrench onto the hexagonal head, some tolerance must be provided between the complementary surfaces. Under the circumstances, all of the torque being applied by the driving unit 82 will be transmitted through the contact points 85. The driving angle indicated at 86 is obviously greater than 60°. In view of this large driving angle, a large component of the force applied by the unit 82 tends to wedge the sidewalls thereof outwardly, frequently causing the same to split unless the sidewall is made sufficiently heavy to resist such forces. Also, the corners 85 of the driven device 83 will be deformed and rounded over until a sufficient contact area is provided between the adjacent surfaces of the driven head 83 and the driving unit 82 to transmit the applied torque. Frequently the corners 85 will be rounded off to such an extend that the driving unit 82 is permitted to rotate freely on the head 83.

Referring again to FIG. 3, attention is directed to the relatively small drive angle indicated at 87 and which is from 10° to 20° and preferably approximately 15°. The maximum of 20° for the drive angle is deemed critical. As the drive angle is increased above 20°, the efficiency of the drive coupling diminishes very rapidly. For example, by increasing the drive angle only 10°, that is, to 30°, the outward force component tending to force the sidewalls of the outer member apart is double the outward force component with a drive angle of 15°. Such force component increases only very slightly between 15° and 20°. As is indicated by the voids 80 FIG. 10), a substantial clearance has been provided, in the instance shown, between the complementary surfaces of the driving tool and the driven head 12, so as to permit ease of assembly of the driver upon the driven device. Even in the situation as illustrated, it is readily apparent that driver engagement will occur over the major portion of the driving surface 76—78 for transmission of torque from the driver to the fastener with a minimum of stress per unit of area. Accordingly, with the design of the present coupling arrangement, much higher values of torque can be transmitted from the driving unit to the driven unit with less wastage of power than has been possible with driving coupling arrangements as previously provided without damaging the surfaces of either the driven unit or the driving tool.

In the preceding description, a driven device is described having a head provided with external driving surfaces. It will be obvious to those skilled in the art, however, that the configuration of the present invention would be equally applicable with respect to driven devices having a head provided with a recess or socket for cooperatively receiving a complementally shaped driver bit.

Figure 12:
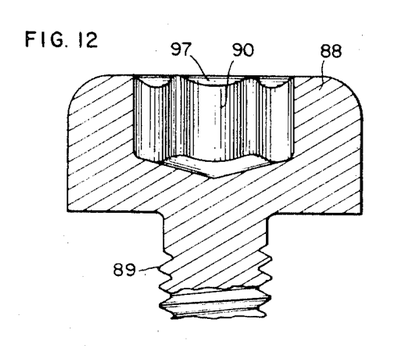
FIG. 12 is a side elevation, partly in section, illustrating a driven member in the form of a fastener device having a recessed driving head.
Figure 13:
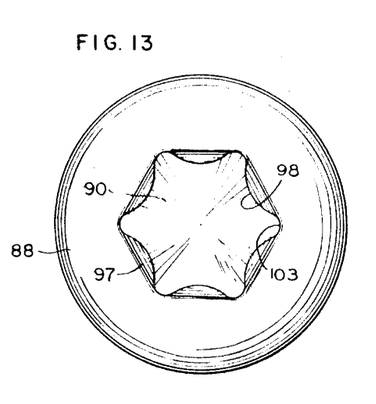
FIG. 13 is a plan view of the device illustrated in FIG. 12.
Figure 14:
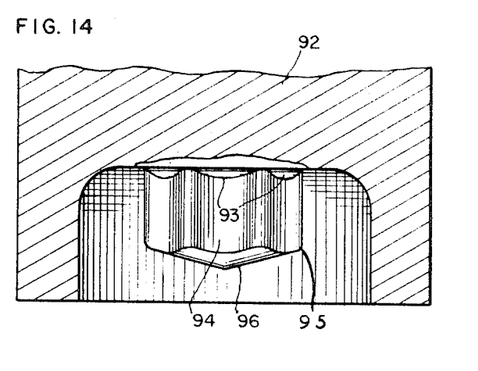
FIG. 14 is a view, partly in section, illustrating a tool useful in connection with the manufacture of the device shown in FIG. 13.

As viewed in FIGS. 12 and 13, a fastener device in this instance comprises a threaded shank 89 with an enlarged head 88 formed on an end thereof. The upper surface of the head 88 is provided with a driver-receiving recess 90 which is of the same cross-sectional configuration as illustrated in the schematic view of FIG. 3, and as is provided in the coupling portion 64 of the driving tool 62. The recess 90 in the head 88 also may be formed in a cold-heading machine with the aid of a tool or punch insert 92 as illustrated in FIG. 14. The punch insert is provided with a nib 94 in its recessed lower end, which is driven in the heading machine against a bloom formed on the end of a suitable workpiece severed from a length of wire or rod stock. The nib 94 is provided with a shallow conical tip 96 for facilitating the entry of the punch into the workpiece by directing the flow of metal outwardly as the punch is advanced thereto ward. The corner between the conical end surface 96 and the sidewalls of the nib proper is slightly rounded as at 95. The inwardly sloping shoulders 93 at the base of the flutes form a cup-shaped depression 97 surrounding the recess 90 and facilitates the guiding of the end of a driver bit into the recess 90. The cross-sectional configuration of the punch nib 94 is the same configuration illustrated in FIG. 3 and also in FIG. 10, and need not be further described. On account of the fact that the circumferential surfaces of the nib are rounded throughout 360° and have no sharp corners, either external or internal, the recess is easily formed and with a high degree of precision. The punches will have a long life because of the rugged design, that is, having a relatively large cross-sectional area as compared with the maximum diameter, with no thin radial fins, as in the case of punches used for forming conventional Phillips-type recesses. Furthermore, due to the absence or relatively narrow recess wings which extend radially outwardly toward the perimeter of the fastener head, the likelihood of cracking of the fastener heads at the outermost ends of such wings is substantially eliminated. Also, because the configuration consists of relatively large radius, rounded surfaces throughout 360°, no stress risers are produced in the finished product thereby making possible the transmission of high torques through the coupling to take full advantage of the strength of the fastener body. This permits a substantial reduction in the overall dimensions of the complementary coupling parts while still permitting the transmission of torque from one part to the other well above the strength limitation of the fastener device, which is determined by the cross-sectional area across the roots of the thread provided thereon.

Figure 15:
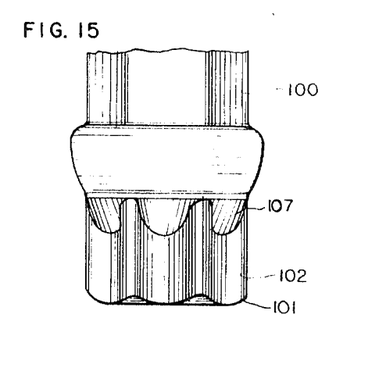
FIG. 15 is a side elevation of a part of a further drive tool useful in connection with the devices of the present invention.

While the tool unit shown in FIG. 14 could form a part of a driving tool for a recessed device as shown in FIG. 12, a more preferred form of driver is shown in FIG. 15. As will become obvious, the tool shown in FIG. 15 could, with minor modification, also be used as a punch tool for forming recess sockets in bodies. The tool unit shown in FIG. 15 is a driver bit comprising a shank portion 100 having a coupling portion 102 formed on one end thereof. The portion 102 may be formed by a reverse extrusion process through the use of an extrusion punch similar to that shown in FIG. 6, or by matching, as desired. The corner 101 of the portion 102 may be chamfered as shown for cooperating with the cupped portion 97 of the recess head 88 for further guiding the tool into the head recess 90. The tool also is provided with reinforcing shoulders 107 and which serve the same purpose as shoulders 58 as described with reference to FIG. 1. The cross-sectional configuration of the tool portion 102 is, again, similar to the configuration described in detail in connection with FIG. 3. The cooperative combination of the driver tool shown in FIG. 15 and a fastener recess 90 as shown in FIG. 12 would be the same as that illustrated in FIG. 10 except that the parts would be reversed. In other words, the outer unit 64 shown in FIG. 10 would, in this case, constitute the driven unit while the inner unit 12 would constitute the driver portion 102.

In comparing the external surfaced head of FIG. 1 with the internal surfaced head of FIG. 12, it will be noted that the height of the driving surfaces relative to the screw size of the former is much greater than in the case of the latter. It will be obvious that the depth of the recess 90 cannot be increased substantially without also increasing the overall head height. However, it will be observed that the inwardly extending ribs 98 have a total effective width, considering normal clearances, indicated by angle 99 in FIG. 3, of approximately 50°. The total cross-sectional or shear area of the ribs 98, as indicated by the cross-hatched portion 104, FIG. 3, is much greater than the area of the flutes 103 therebetween. The latter area, which is indicated by cross-hatching 105, represents the shear area of the driver ribs which will occupy the flutes 103. The driver bit will ordinarily be of material, and properly heat-treated so as to be, much stronger and tougher than the screw. It is important therefore that the screw recess ribs 98 have a larger shear area as shown in order adequately to withstand a high torque which can be imposed thereupon by the driver. It is preferred that the shear area 114 of the socket ribs 98 be approximately twice the shear area 105 of the mating driver ribs.

In the case of the external drive surfaced heads as shown in FIG. 1, as previously mentioned the ribs already possess high strength due to the extrusion thereof and on account of the reinforcing shoulders 58. If greater strength is desired, the head can readily be extruded to a greater extent to meet the necessary strength requirements while still holding the head size down to overall dimensions less than those required for comparable, heretofore known types of heads.

Figure 16:
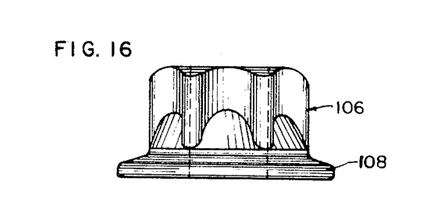
FIGS. 16 and 17 are a side elevation and a plan view, respectively, of a nut incorporating a surface configuration in accordance with the present invention.
Figure 17:
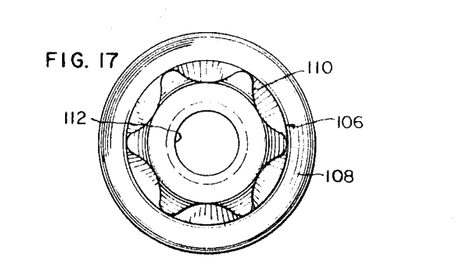

The torque-transmission coupling combination, as previously described, is virtually universal in its scope of applicability and may be used in many different instances where a polygonal surface configuration has been provided in the past for facilitating the transmission of torque from one unit to another. For example, in FIGS. 16 and 17 is illustrated a nut 106 having an enlarged bearing washer-type base 108. The cross-sectional configuration of the head portion, as illustrated more clearly at 110 in FIG. 17 is, again, identical to the configuration illustrated schematically in FIG. 3. The nut 108 is provided with a threaded internal bore 112.

Figure 18:
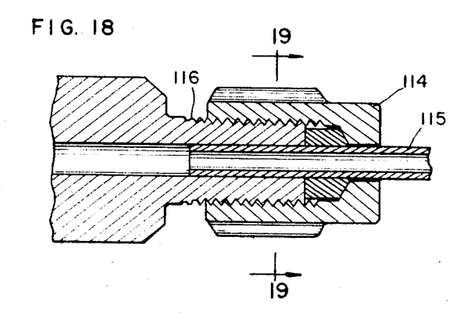
FIG. 18 is a cross-sectional view illustrating a tube fitting in accordance with a further application of the invention.
Figure 19:
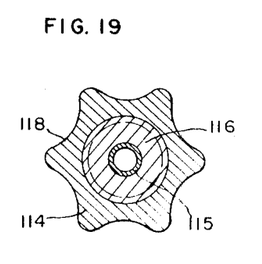
FIG. 19 is a sectional view taken along the line 19—19 of FIG. 18.

FIGS. 18 and 19 illustrate a typical form of a tube fitting. As shown, the fitting 114 includes a common form of a sleeve nut used for securing a tube 115 onto a threaded nipple 116. Instead of being provided with a hexagonal outer surface as in the usual practice, the fitting is in this instance provided with a cross-sectional hex-lobular configuration 118 which, again, is substantially identical to that previously described in connection with FIG. 3. Any suitable form of bifurcated spanner wrench could be used with fittings of this type, such as that suggested in FIGS. 26 and 27.

Figure 20:
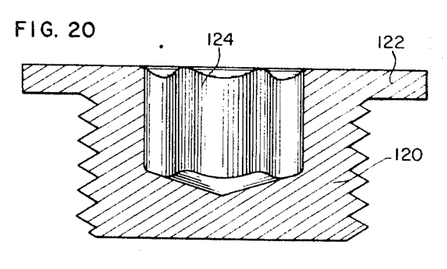
FIGS. 20 and 21 are cross-sectional and plan views, respectively, of a further form of fitting in accordance with a further embodiment of the present invention.
Figure 21:
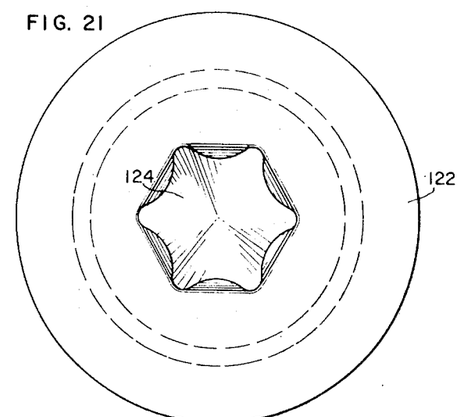

In FIGS. 20 and 21 is illustrated a closure plug adapted to be threaded into an internally threaded opening. The fitting in this instance comprises a threaded body 120 having a flanged upper end 122, the upper surface being recessed as indicated at 124. The cross-sectional configuration of the recess 124 is the same as illustrated in FIG. 3.

Figure 22:
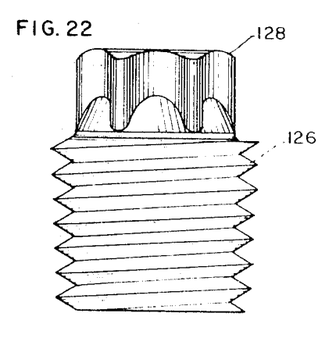
FIGS. 22 and 23 are side elevation and plan views, respectively, of a further embodiment of the invention.
Figure 23:
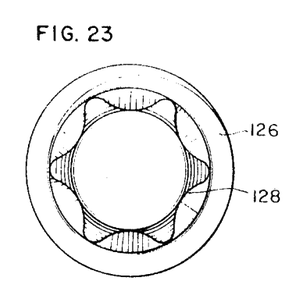

In FIGS. 22 and 23 is illustrated a further typical form of fitting, which in this instance is a plug consisting of an externally threaded body portion 126. The upper end of the plug as viewed in FIG. 23 is provided with a driving head 128. The cross-sectional configuration of the driving head is also as shown in FIG. 3.

An important feature of the present invention resides in the fact that many conventional forms of wrenches may be utilized in the various driven units as hereinbefore described of either the internal or external type. While it is preferred, of course, in all instances, for the driving unit to have driving surfaces which are fully complementary to those of the driven unit, it will be understood that the proper tool might not always be on hand to the person engaged in servicing, such as in the case of emergencies.

Figure 24:
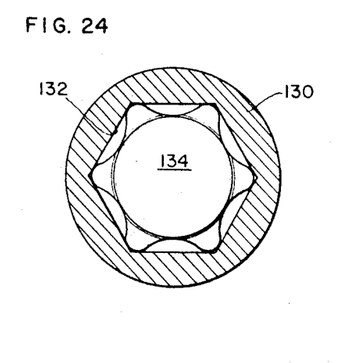
FIG. 24 is a sectional view illustrating a hex socket wrench assembled over an external driving head of the present invention.
Figure 25:
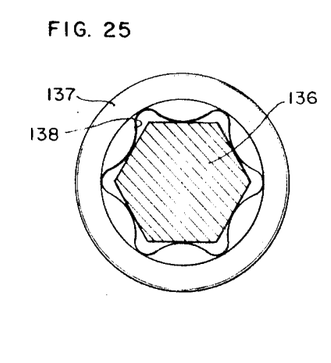
FIG. 25 is a sectional view illustrating a hexagonal end wrench assembled inside of a recess constructed in accordance with the present invention.

In FIG. 24 is illustrated a wrench 130 of the socket type having a conventional hexagonal internal surface 132. As thus illustrated, a hex socket wrench may readily be used in connection with an externally surfaced hex-lobular unit 134 constructed in accordance with the present invention. In FIG. 25 is illustrated an externally surfaced hexagonal wrench 136 fitted within an internally surfaced hex-lobular recess 138 of a driven unit 137 of the present invention. It will be observed that the cross-sectional size of the wrench 136 relative to the socket 138 is substantially the same as the hexagon shown at 21 in FIG. 3.

Figure 26:
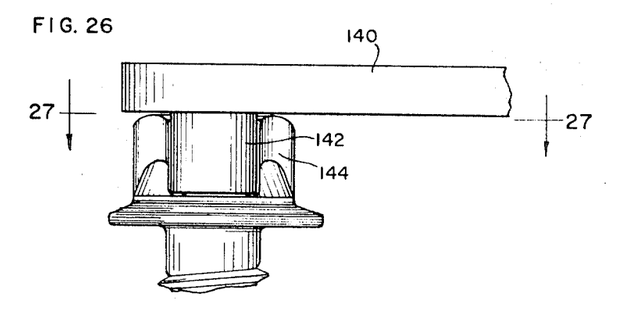
FIG. 26 is a side elevation illustrating a spanner wrench assembled upon an externally surfaced driven head of the present invention.
Figure 27:
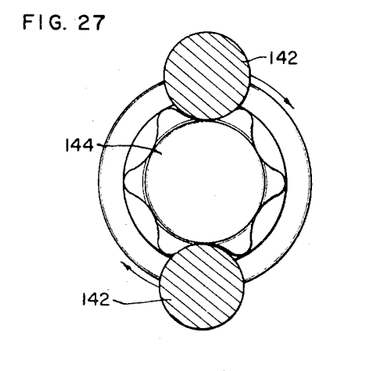
FIG. 27 is a sectional view taken along the line 27—27 of FIG. 26.

Spanner wrenches of various different forms may also be used with driven units of the type herein described. For example, as illustrated in FIGS. 26 and 27, a spanner wrench is indicated at 140 having a pair of pins 142 extending from one surface thereof parallel to each other, both being normal to the surface of the wrench handle 140. The radius of curvature of the pins 142, or at least that side thereof engaging the head of the device 144, is only slightly smaller than the concave surfaces of an externally headed device 144 as shown. Because of the large area of contact of the pins 142 with the adjacent surfaces of the device 144, a very substantial amount of torque can be transmitted between such a spanner wrench and the device 144. For driving a fitting shown in FIGS. 18, 19, the end of the handle in which the pins 142 are mounted would be suitably bifurcated.

It will be obvious to those skilled in the art that wrenches of still different types, such as open end wrenches or wrenches of the so-called Loc-Rite type, may also be used with driven units of the externally surfaced type previously described herein.

For purposes of comparing the torque-transmission characteristics between complementary, hex-lobular coupling units of the type herein described and torque-transmission couplings of the conventional, hexagonal type, a series of tests were run. For purposes of the tests, heads of both types as are provided on 5/16 inch screws were used. Conventional, indented, hexagonal heads for such size screws have a dimension of 0.50 inch max. across the flats and a height of 0.30 inch max. Heads of the present invention as provided for such size screws have an effective height of 0.166 inch max., a maximum diameter as indicated at 25 in FIG. 3 of 0.367 inch max. and a minimum diameter as indicated at 26 in FIG. 3 of 0.268 inch max. All of the test samples were of 1022 steel material and similarly heat-treated. Standard hexagonal socket wrenches were used in connection with the hex head samples and a socket wrench as illustrated at 64 in FIG. 10 herein was used for the hex-lobular heads of the present invention. During the tests of six hexagonal heads, an end load of 40 pounds was applied to the wrench and cam-out of the wrench occurred at applied torques varying from 360 inch-pounds to 450 inch-pounds, with an average of 418 inch-pounds. Similar tests were run using six hex-lobular heads of the present invention, but in this case no end load was applied to the wrench and torque was applied until failure by shear occurred. In no instance during the last-mentioned tests did cam-out occur, while shearing of the head occurred at torques varying from 660 inch-pounds to 720 inch-pounds, the average being 710 inch-pounds. The shear strength of the threaded section of a 5/16inch-18 screw, of the same material and heat-treat, is 380 inch-pounds. Even though the hex-lobular head has a much smaller size and amount of material contained therein than the conventional, hexagonal head, the hex-lobular head of the present invention exhibited no tendency to cause the wrench to cam-out as in the case of the hexagonal head and wrench, even at zero end load. Thus, even though the hex-lobular head is of much smaller transverse dimension than the conventional, hexagonal head, it still possesses more than adequate shear strength as compared with the shear strength of the threaded portion of the screw.

Figure 28:
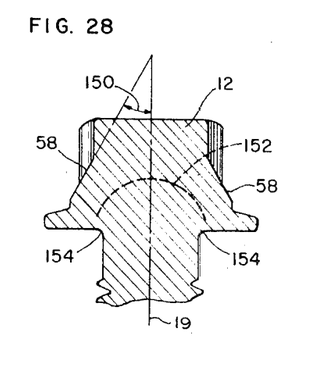
FIG. 28 is a schematic sectional view taken along the line 28—28 of FIG. 2.

Due to the extrusion process with which the head of an external surfaced unit is formed, a high strength relationship is also created between the head and shank portion, such as for a fastener device as illustrated in FIG. 1. As illustrated in FIG. 5, only a slight amount of upsetting of the end of the metal blank 44 is performed in the first header blow. As a result, the metal of the bloom 42 thus formed is left in a relatively unstressed condition. In the second blow, the flutes are formed in the outer sidewall of the bloom 42 by means of the converging shoulders 50 of the extrusion die illustrated in FIG. 6. As indicated by the sectional view of FIG. 28, the shoulders converge toward the longitudinal axis 19 of the head by an angle 150 of the order of 30°. The compression of the metal between the shoulders 50 of the extrusion die producing the shoulders 58 of the finished head results in a somewhat stressed area within the metal of the head but which is dome-shaped as indicated by the dotted lines 152. While the metal is not overly stressed during the reverse extrusion operation, due to the fact that the stressed area extends up into the central portion of the head, the juncture between the head and the shank is not weakened thereby. In some heading operations, where the head is formed by a plurality of upsetting steps, a highly stressed zone is created between the corners 154 transversely of the shank at the juncture between the shank and the head. Such a condition is undesirable and frequently results in a failure diametrically of the shank directly beneath the head.

It is obvious from the foregoing disclosure that the invention is not to be restricted to fastener heads and drivers therefor inasmuch as the invention is equally applicable to fittings and to torque-transmission couplings of a wide variety of forms. Moreover, whether the coupling unit is of an internally surfaced or externally surfaced type, the driven unit is not dependent for its operability upon the use of a driving member of identical complementary surface configuration. The tools for use with the present invention may consist of either drivers, punches or torque-transmission coupling components as indicated in FIGS. 8 and 9 at 67 and 69 respectively. In each instance, the tools or tool components are substantially identical to each other with minor variations between the different forms.

The coupling components according to the present invention may be formed from conventional steels and alloys, but may also be formed from softer metals, such as brass or aluminum, without undue stress or deformation thereof as a result of high torque or high-impact driving means. In addition to such metals, the coupling components according to the present invention can also be formed of plastic. Again, a reasonably high torque or impact may be employed without crushing, spreading or appreciably distorting the soft component. For example, in the instance of a six-lobe plastic nut, the configuration in accordance with the present invention produces an appreciable driving surface in a torque-producing direction rather than in a damage-producing direction, such that the nut may be successfully driven without camming of the surface or other damage despite application of high driving forces. By the term "semicylindrical" as applied to the two series of curved surfaces, I mean surfaces which are curved so as to conform substantially to portions of cylinders.

In the foregoing specification reference is made to the "shear areas" as shown in FIG. 3 at 104 and 105. It is to be understood that by the usage of such term in the foregoing specification and in the claims it is meant to include shear volumes having a cross-sectional shape as represented by the areas 104 and 105.

While I have described my invention with respect to the manufacture of several different embodiments, it must be realized that the invention permits numerous modifications in arrangement and detail. I therefore claim as my invention all such modifications as come within the true spirit and scope of the appended claims.

I claim:

1. In an article of manufacture of the class described comprising a body including a portion having a first series of spaced apart, semicylindrical surfaces and a second series of semicylindrical surfaces alternating with the surfaces of said first series and merging tangentially therewith, the axes of curvature of said two series of surfaces extending substantially parallel with each other and with the central axis of said body;

the axes of curvature of said first series of surfaces being disposed between the respective corresponding surface and said central axis;

and the axes of curvature of said second series of surfaces being disposed on the opposite side of the respective corresponding surface with respect to said central axis;

the cross section of said surfaces of said portion being of symmetrical, generally hex-lobular configuration;

the axes of curvature of said first series of surfaces being coextensive with the apices of a regular hexagon;

the invention being characterized in that:

a. the radius of curvature of said first series being approximately 5 to 10 percent of the major diameter across said first series of surfaces;

b. the radius of curvature of said second series of surfaces being more than twice as great as that of said first series of surfaces whereby the angular extent of said second series of surfaces is materially greater than the angular extent of said first series of surfaces, the latter being of the order of 20° to 25°.

c. the difference between the maximum radial dimension of said first series of surfaces and the minimum radial dimension of said second series of surfaces being approximately 50 percent greater than the radius of said first series of surfaces; and d. contiguous surface portions of said first and second series of surfaces defining a driving surface with a drive angle of from 10° to 20°, the drive angle being defined as the angle between a line tangent to the point of contiguity of said surface portions and the radius of said body bisecting the semicylindrical surface of said first series of surfaces immediately adjacent said driving surface.

2. An article of manufacture according to claim 1 in which the difference between the maximum radial dimension of said first series of surfaces and the minimum radial dimension of said second series of surfaces is between 25 and 30 percent of said maximum radial dimension.

3. An article of manufacture according to claim 1 in which said first series of surfaces define convex ridges and said second series of surfaces define concave flutes on the outside perimeter of a driven unit.

4. An article of manufacture according to claim 1 in which said first series of surfaces define concave flutes and said second series of surfaces define inwardly extending convex ribs forming the internal sidewalls of a recess in a driven member.

5. An article of manufacture according to claim 1 in which said first and second series of surfaces define the internal sidewall surfaces of an extrusion punch.

6. An article of manufacture according to claim 1 in which said first and second series of surfaces define the external surface of a punch nib, said nib including a conically tapered point, said nib being disposed within a recess at one end of the punch body.

7. An article of manufacture according to claim 1 in which an enlarged bearing washer is provided between said two series of curved surfaces and the remainder of said body.

8. An article of manufacture according to claim 1 in which said first series of surfaces define convex ridges and said second series of surfaces define concave flutes, and a shoulder extending from the inner ends of said ridges and converging within said flutes toward the central axis of said body and in the direction toward the free end of said ridges, said shoulders creating a dome-shaped zone of stressed metal spaced toward said free end and away from the juncture between said hex-lobular surfaced portion and the remainder of said body portion.

9. A tool comprising a body including a portion having a first series of spaced apart, semicylindrical surfaces and a second series of semicylindrical surfaces alternating with the surfaces of said first series and merging tangentially therewith, the axes of curvature of said two series of surfaces extending substantially parallel with each other and with the central axis of said body;

the axes of curvature of said first series of surfaces being disposed between the respective corresponding surface and said central axis;

and the axes of curvature of said second series of surfaces being disposed on the opposite side of the respective corresponding surface with respect to said central axis;

the cross section of said surfaces of said portion being of symmetrical, generally hex-lobular configuration;

the axes of curvature of said first series of surfaces being coextensive with the apices of a regular hexagon;

the invention being characterized in that:

a. the first series of surfaces being convex surfaces and having a radius of curvature of approximately 5 to 10 percent of the major diameter across said first series of surfaces;

b. said second series of surfaces defining concave flutes and having a radius of curvature more than twice as great as that of said first series of surfaces;

c. contiguous surface portions of said first and second series of surfaces defining a driving surface with a drive angle of from 10° to 20°, d. and a shoulder extending angularly outwardly from the bottom of each of the flutes defined by said second series of surfaces to the outermost points of said first series of surfaces where they merge with the remainder of said body.

10. A tool as defined in claim 9 in which the free end of the portion defined by said first and second series of semicylindrical surfaces is provided with a relatively flat, conical point and in which the corner between said conical surface and said semicylindrical surfaces is rounded.

11. A tool as described in claim 9 and in which each of said shoulders extend at an angle approximately 30° with respect to the central axis.

12. A tool for fluted hex-lobular heads comprising a body including a recessed portion having a first series of spaced apart, internal semicylindrical surfaces and a second series of internal semicylindrical surfaces alternating with the surfaces of said first series and merging tangentially therewith, the axes of curvature of said two series of surfaces extending substantially parallel with each other and with the central axis of said body;

the axes of curvature of said first series of surfaces being disposed between the respective corresponding surface and said central axis;

and the axes of curvature of said second series of surfaces being disposed on the opposite side of the respective corresponding surface with respect to said central axis;

the cross section of said surfaces of said portion being of symmetrical, generally hex-lobular configuration;

the axes of curvature of said first series of surfaces being coextensive with the apices of a regular hexagon;

the invention being characterized in that:

a. the first series of surfaces being concave surfaces and having a radius of curvature of approximately 5 to 10 percent of the major diameter across said first series of surfaces;

b. said second series of surfaces forming convex ribs having a radius of curvature more than twice as great as that of said first series of surfaces;

c. contiguous surface portions of said first and second series of surfaces defining a driving surface with a drive angle of from 10° to 20°;

d. and a shoulder extending angularly outwardly on the ribs defined by said second series of surfaces to the outermost ends of said ribs.

13. A fastener device comprising a shank portion, and a torque-transmitting head provided with a lateral surface at the end thereof opposite said shank portion comprising a plurality of outwardly extending equal-sized, equispaced, semicylindrical lobes disposed in circular array about said head with the circumferential extent of each such lobe being of the order of 20° to 25°;

wherein the centers of said lobes are defined by the apices of a regular hexagon in a plane perpendicular to the axis of said device, and wherein the lateral surface of said head between each of said lobes comprises an inwardly directed semicylindrical curved surface extending at least substantially to the side of said regular hexagon midway between the said lobes, the radius of curvature of said lobes being between 5 and 10 percent of the major diameter across said lobes, said inwardly directed, semicylindrical, curved surface having a radius at least twice as great as the radius of said lobes, and joining said lobes approximately tangentially and defining a substantial area of driving surface at the sides of said lobes with a driving angle of from 10° to 20°, said driving surface providing for deep torque engagement of said lobes over said substantial area for minimizing force concentration thereon when said device is driven, said driving surface including contiguous surface portions of both said lobes and said inwardly directed curved surfaces and said driving angle being defined as the angle between a line tangent to a point of contiguity of said surface portions and the radius of said head bisecting the lobe immediately adjacent said driving surface.

14. A fastener driver device comprising a torque-transmitting head, the lateral surface of said torque-transmitting head describing a plurality of equal-sized, equispaced, semicylindrical lobes having a radius of curvature between 5 and 10 percent of the major diameter across said lobes, said lobes being disposed in circular array with the circumferential extent of each such lobe being of the order of 20° to 25° and adapted to drive a complementally shaped fastener device, wherein the centers of said lobes are defined by the apices of a regular hexagon located in a plane perpendicular to the longitudinal axis of said device, said lobes being disposed on the opposite sides of said apices with respect to said axis, and wherein the lateral surface of said body between each of said lobes comprises a curved surface oppositely directed from the said lobes and extending at least substantially to a side of said regular hexagon midway between the apices thereof, said oppositely directed curved surface extending between points on respective lobes for including an appreciable cylindrical portion at the sides of said lobes forming a driving surface at a side thereof having a driving angle of from 10° to 20°, said driving surface including contiguous surface portions of both said lobes and said oppositely directed curved surfaces and said driving angle being defined as the angle between a line tangent to a point of contiguity of said surface portions and the radius of said torque-transmitting head bisecting the lobe immediately adjacent said driving surface, the difference between the maximum radial dimension of said lobes from the axis of said head and the minimum radial dimension of said oppositely directed surfaces from said axis being approximately 50 percent greater than the radius of said semicylindrical lobes.

15. The device according to claim 14 wherein said oppositely directed surface comprises a semicylindrical surface of larger radius of curvature than said lobes and which tangentially intersects said lobes at said driving surface, said oppositely directed semicylindrical surface extending at least substantially to the side of said hexagon midway between said lobes.

16. A fastener device comprising a threaded shank portion and a torque-transmitting head including a washer portion adjoining said shank portion, said torque-transmitting head where it extends beyond said washer portion having a lateral driving surface defining a plurality of outwardly extending equal-sized, equispaced, semicylindrical lobes disposed in circular array about the axis of said head with the circumferential extent of each such lobe being of the order of 20° to 25°, said lobes extending longitudinally of said head and parallel to the axis thereof, wherein the centers of said lobes are defined by the apices of a regular hexagon in a plane perpendicular to the axis of said device, and wherein the lateral surface of said head between each of said lobes comprises an inwardly directed semicylindrical curved surface extending at least substantially to the side of said regular hexagon midway between the said lobes, said inwardly directed, semicylindrical, curved surface having a radius greater than twice the radius of said lobes, and joining said lobes approximately tangentially, and retaining a substantial area of driving surface at the sides of said lobes with a driving angle of from 10° to 20°, and a shoulder extending angularly inwardly from said washer portion to a point approximately halfway up said curved surface from said washer portion, said driving surface including contiguous surface portions of both said lobes and said inwardly directed curved surfaces, and said driving angle being defined as the angle between a line tangent to a point of contiguity of said surface portions and the radius of said torque-transmitting head bisecting the lobe immediately adjacent said driving surface.

17. An article of manufacture as described in claim 1 in which the area of the cross section outwardly of the second series of surfaces and between the midpoints of adjacent ones of said first series of surfaces is approximately double the area of the cross section inwardly of said first series of surfaces between adjacent midpoints of said second series of surfaces.

UNITED STATES PATENT OFFICE
CERTIFICATE OF CORRECTION

Patent No. 3,584,667                    Dated June 15, 1971

Inventor(s) Bernard F. Reiland

It is certified that error appears in the above-identified patent and that said Letters Patent are hereby corrected as shown below:

Abstract, 4th line from end, after "driving" the word "area" should be --angle--

Col. 1, line 6, "Drive" should be --Driver--

Col. 2, line 16, "mere" should be --merge--

Col. 6, line 22, "extend" should be --extent--

Col. 7, line 14, "of" should be --or--

Signed and sealed this 16th day of November 1971.

(SEAL)
Attest:

EDWARD M. FLETCHER, JR.                ROBERT GOTTSCHALK
Attesting Officer                      Acting Commissioner of Patents